United States Patent [19]
Farrell

[11] Patent Number: 5,143,433
[45] Date of Patent: Sep. 1, 1992

[54] NIGHT VISION BACKLIGHTING SYSTEM FOR LIQUID CRYSTAL DISPLAYS

[75] Inventor: James F. Farrell, Etobicoke, Canada

[73] Assignee: Litton Systems Canada Limited, Etobicoke, Canada

[21] Appl. No.: 786,484

[22] Filed: Nov. 1, 1991

[51] Int. Cl.$^5$ .................................. G01D 11/28
[52] U.S. Cl. ........................... 362/29; 362/26; 362/31; 362/62; 340/784; 359/49; 359/50
[58] Field of Search ............ 340/784; 359/48, 49, 359/50; 362/23, 62, 31, 32, 26, 27, 29, 30

[56] References Cited

U.S. PATENT DOCUMENTS

| | | | |
|---|---|---|---|
| 4,229,783 | 10/1980 | Eberhardt | 362/23 |
| 4,263,594 | 4/1981 | Masucci | 359/48 |
| 4,580,196 | 4/1986 | Task | 362/62 |
| 4,581,683 | 4/1986 | Reiter et al. | 362/62 |
| 4,887,189 | 12/1989 | Garrett | 362/62 |
| 4,904,991 | 2/1990 | Jones | 362/62 |
| 4,934,793 | 6/1990 | Klein | 362/62 |
| 4,945,350 | 7/1990 | Kawamura | 340/784 |
| 5,089,943 | 2/1992 | Wolfelschneider | 362/23 |

FOREIGN PATENT DOCUMENTS

| | | | |
|---|---|---|---|
| 0127717 | 6/1987 | Japan | 359/50 |
| 0213688 | 3/1987 | United Kingdom | 359/49 |

Primary Examiner—Ira S. Lazarus
Assistant Examiner—Sue Hagarman
Attorney, Agent, or Firm—Edmund W. Rusche

[57] ABSTRACT

This invention presents a way to provide night vision viewing compatibility of backlit electrooptic modulated light valve or LCD displays designed for daylight viewing. Liquid crystal displays (LCD) designed with backlighting systems which provide a high brightness, good contrast display under daylight conditions are inappropriate for use in dark, night time conditions where viewing of the display is desired utilizing electronic night vision equipment. This invention describes improvements to standard backlighting displays which through the utilization of arrays of low-level intensity light sources such as secondary fluorescent light sources, miniature incandescent lamps or light emitting diodes, the general means used in daylight vision can be turned off and the secondary low-level lighting sources achieve a minimum intensity acceptable for night vision electronic viewing.

25 Claims, 4 Drawing Sheets

FIG. 6
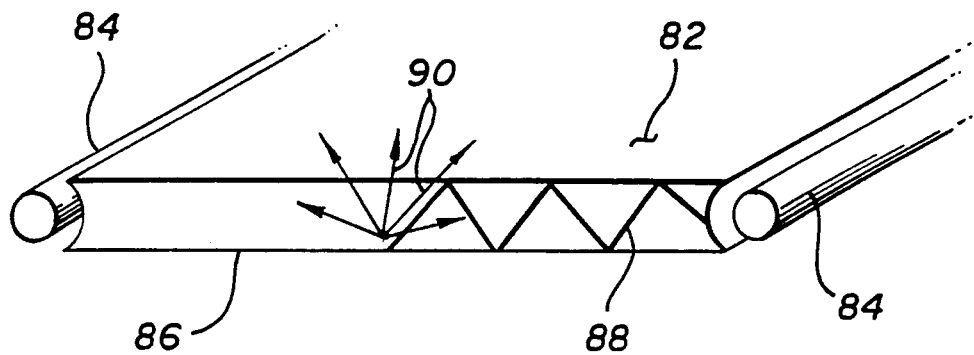
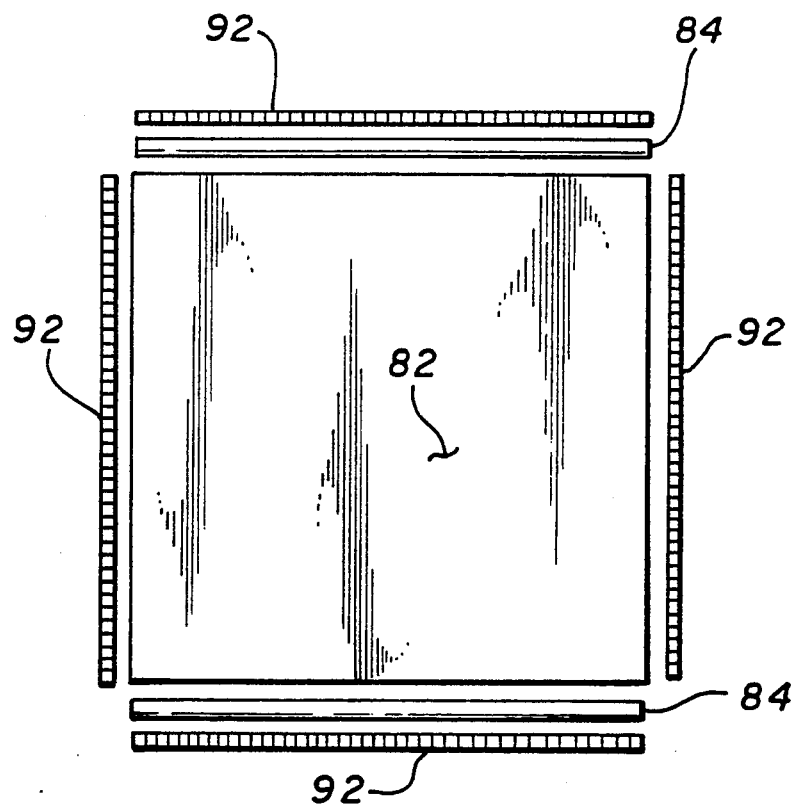
FIG. 7

NIGHT VISION BACKLIGHTING SYSTEM FOR LIQUID CRYSTAL DISPLAYS

BACKGROUND OF THE INVENTION

This invention relates to an apparatus and method to allow an active matrix liquid crystal display to be viewed effectively in either daylight conditions or with the aid of night vision electronic viewing equipment under dark conditions.

Active matrix liquid crystal displays are presently being developed and used widely as instrument monitors in many fields of use. Particularly, it is advantageous to make use of flat liquid crystal displays in the cockpit instrumentation panel where the status of various sensors are displayed for viewing by the pilot. In the past, such displays contained cathode ray tubes (CRT) to convert the electronic information to visual pictures of the data viewable by the pilot. CRT displays require considerable volume for their installation. The advantage of any flat-panel displays such as active matrix liquid crystal displays is obvious.

Liquid crystal displays can be constructed as multi and full color displays in several ways. One way is to use fluorescent lamps excited by ultraviolet radiation as a backlighting panel. The light from this bright flat-panel is modulated by the LCD to create the patterns of information bearing pictures on the display for viewing by the operator. The backlighting panel can be a fluorescent white lamp with proper filters or of a properly organized blue-green-red matrix fluorescent phosphor structure.

Several types of fluorescent lighting for LCD backlighting have been developed and used. One type, as an example, is a flat fluorescent lamp similar to that reported in the article "Flat Fluorescent Lamp for LCD Back-light" by K. Hinotani, S. Kishimoto, and K. Terada, 1988 Society for Information Display, International Display Research Conference, pp. 52-55. Hinotani et al shows the construction of a flat-panel fluorescent lamp designed for use in small size portable LCD televisions.

U.S. Pat. No. 4,842,378 by Flasck et al presents a method of illuminating flat panel displays utilizing a serpentine shaped fluorescent tube which is placed adjacent to the back screen of the panel to backlight the screen. Also shown in this patent is the use of individual fluorescent tubes spaced parallel to one other along a back plane to create the backlighting for flat-panel display purposes.

U.S. Pat. No. 4,748,546 by Ukrainsky presents a similar use of fluorescent tubes where such fluorescent tubes are embedded in RTV rubber or other transparent potting material, and with the use of diffusing layers becomes a backlighting device for a flat panel display.

In addition to the use of fluorescent tubes other methods of providing light sources have been suggested. The U.S. Pat. No. 4,573,766 by Bournay, Jr. et al presents a light emitting diode (LED) backlighting panel with the LED light sources installed in side edges of the solid state panel. The panel then serves as a wave guide to distribute the light along a roughened surface perpendicular to the edges where the LED's are installed. At the roughened surface the light is diffused upward through the LCD and display area.

Each of these methods of lighting a flat-panel display, and others not mentioned here, provide the capability and facility of emitting light at high intensity quite suitable for daylight viewing. In many cases, particularly military uses, it becomes necessary to be capable of viewing the same display during dark conditions where the viewer is utilizing night vision electronic equipment. Such night vision electronic equipment usually is designed to be sensitive to very low light level intensities, frequently in the near infrared region.

Any near infrared source of light at an intensity above the surrounding night time conditions will have the tendency to cause night vision electronic viewing equipment to overload and cease functioning. Quite clearly then, the use of LCD displays designed for daylight use become a handicap at night in an aircraft where a pilot is relying on night vision equipment to view the environment about him. It became necessary, therefore, to conceive and develop a method whereby the intensity of light emitted by the LCD display in the near infrared spectrum is sufficiently low as not to interfere with the operation of night vision equipment and would thus allow the operator the ability to view such display through the night vision equipment.

One possible solution to this problem is the design of an optical filter for the display surface which would allow sufficient visible throughput for daylight observation while maintaining sufficient suppression of the transmission of wavelengths that night vision equipment are susceptible to, e.g. infrared (IR). Several studies were conducted by the inventor on candidate filters for such a purpose. Unfortunately, the results revealed that those filters which would reduce the IR portion of the spectrum simultaneously did not have the best visible transmission. Therefore, with the reduced visible transmission, operation under daylight conditions was handicapped by the reduced brightness of visible light available at the display.

It is an object of this invention to present an apparatus and method for converting a standard fluorescent activated backlit display suitable for daylight viewing into a simultaneous display capability of emitting very low-level light intensity during dark viewing conditions with night vision equipment.

It is a further object of this invention to provide, by the addition of a secondary matrix of fluorescent light sources, or either light emitting diodes or miniature low-level incandescent lamp light sources, the ability to convert a standard fluorescent backlit active matrix liquid crystal display into a display capable of effective viewing during daylight conditions with the unaided eye and during dark night conditions with the observers eyes augmented by night vision electronic equipment.

SUMMARY OF THE INVENTION

The invention as conceived basically leaves the design of the backlit liquid crystal display in its standard form for daylight viewing with the unaided eye. It modifies the backlighting portion of the system to incorporate secondary arrays of fluorescent light tubes augmented with filters and diffusers, arrays of miniature LED or arrays of filtered incandescent low-level light sources. The secondary fluorescent light sources will need little color balance adjustment since they compliment the same technique used for daylight viewing. Although we focus our discussion mainly on LCD type displays, it is to be recognized that the invention is applicable to any backlit display where an electrooptic modulated light valve functions as the medium for controllably modifying light being transmitted through it into readable patterns of information.

Low-level miniature light sources would be installed in a manner to emit a balanced white color to optimize the color control of the transmitted light by the LCD. These low intensity miniature source lamps can be a combination of red, blue and green light sources respectively. The relative intensity of the red, blue and green light can be individually adjusted so that the color balance of the display is selectable.

The use of secondary arrays of fluorescent lamps involves placing them essentially below the primary fluorescent tubes in a manner that filters and diffusers can be interposed to reduce the light intensity from the secondary array, and also to allow the light from the secondary array to further diffuse through portions of the primary fluorescent tubes used for daylight viewing. During low light viewing, the primary fluorescent tubes are, naturally, deactivated.

The miniature, low-level lamps are chosen so that their emission is night vision compatible; therefore, there is no need to optically filter the emission of the primary fluorescent tubes by the use of a specially designed filter. Again, during night time viewing, the primary fluorescent lamps are turned off.

If miniature, low-level lamps are located directly behind the fluorescent tubes, the light from the low-level, miniature lamps is diffused by the tubes. This diffusion will tend to spread the low-level light evenly across the surface of the display, as is designed to occur when such primary fluorescent tubes are activated to create normal backlighting during daylight viewing.

If the low-level lamps are arrayed and located not to reside directly behind existing fluorescent tubes, the use of a diffusing plate can be used as may be necessary. This diffusing plate may be located either at the liquid crystal display or just above the low-level intensity lamps.

The above location of the low-level intensity lamps in the back plane of the backlighting source is effective for those backlit sources utilizing fluorescent lighting tubes or flat fluorescent lamps wherein the entire cavity behind the liquid crystal display functions as a fluorescent source of light.

The invention also introduces the use of the miniature, low-level intensity lamps with solid state light guide devices usually containing a roughened surface to cause light transmitting within the light guide medium to reflect in a diffused manner towards and through the liquid crystal display viewing area. Such solid state light guide systems are also usually illuminated by a fluorescent lamp source, although other forms of light source located along the edges of the light guide have been used. To convert this form of backlighting, the invention utilizes low-level intensity light sources located behind existing fluorescent lamps in a similar manner as described above.

BRIEF DESCRIPTION OF THE DRAWINGS

FIG. 6 shows a solid state light wave guide backlighting source illuminated by side mounted fluorescent light tubes.

FIG. 7 shows a view of the solid state backlighting source system augmented with low-level light sources.

FIG. 8 shows a cut away view of the construction of a backlit display utilizing primary fluorescent light tubes backed by slots positioned to allow low-level light from secondary fluorescent light tubes to filter through.

DETAILED DESCRIPTION OF THE PREFERRED EMBODIMENT

The invention presents a backlit liquid crystal display panel which is readable with the unaided eye under bright lighting conditions of daylight and is also readable with night vision equipment under dark conditions of night, and which comprises the elements of a liquid crystal panel, or any electrooptically modulated light valve 12, that controllably modifies the light being transmitted through the panel into readable color patterns of information, a means for emitting high intensity light through the liquid crystal panel which has an intensity suitable for daylight viewing of the display, and a means for emitting low intensity light through the crystal panel for viewing in dark conditions with night vision equipment. In the usual case, fluorescent lighting tubes are used to provide the high intensity light sources for daylight viewing of the display. To the inventors knowledge, at the present, no suitable light source has been suggested or implied in any need for a low intensity capability for use with electronic night vision equipment except for the invention presented herein.

Figure 8:
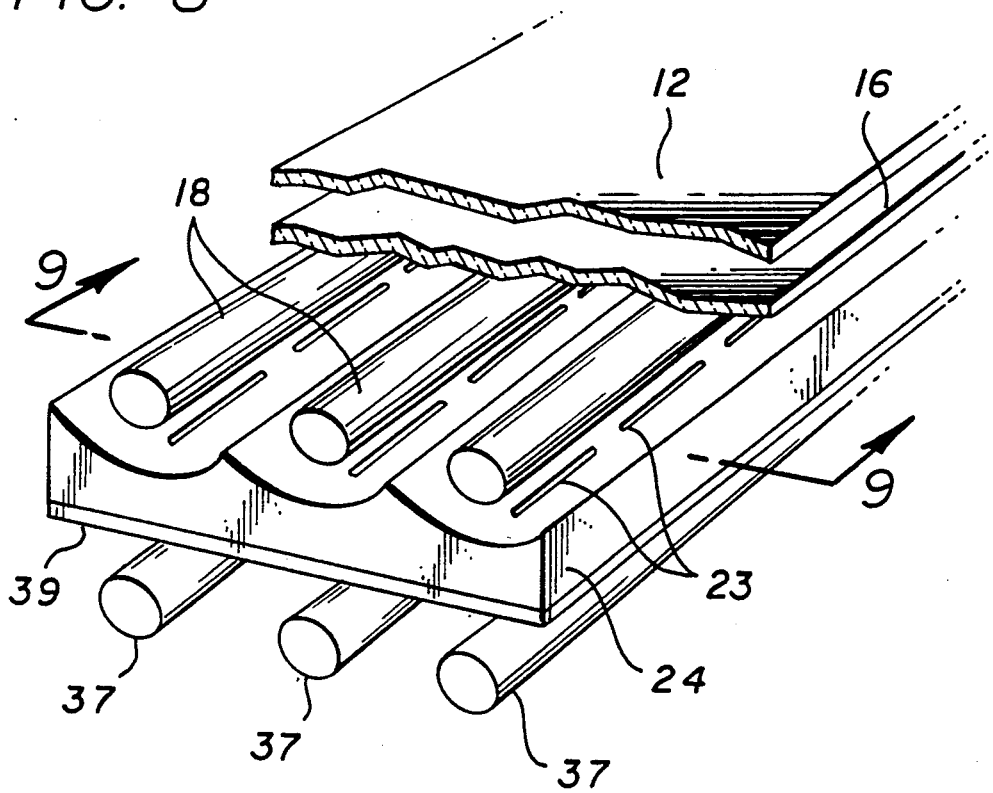
Figure 9:
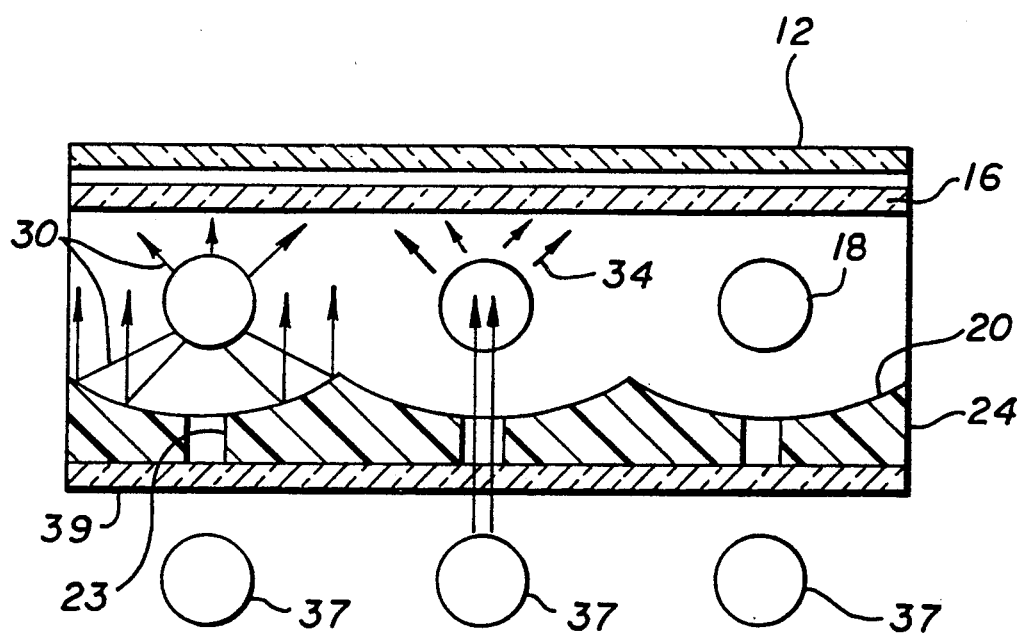
FIG. 9 is a cross-sectional view from FIG. 8 showing detail of low-level light from secondary fluorescent sources beneath the primary fluorescent light tubes

A preferred embodiment of a liquid crystal display panel is shown in FIGS. 8 and 9. This embodiment utilizes primary fluorescent light tubes 18 either formed in a continuous serpentine fashion to attempt to achieve light distribution evenly over liquid crystal display panel 12, or alternatively by using fluorescent light tubes 18 positioned parallel to one another behind said liquid crystal panel display or electrooptically modulated light valve unit 12. FIG. 8 illustrates the general construction for an LCD display utilizing separate, parallel fluorescent light tubes 18 positioned behind liquid crystal display panel 12. FIG. 9 shows a cross-sectional view at points A—A in FIG. 8 which further aid to view the construction configuration.

A reflector body 24 is placed behind fluorescent tubes 18 to reflect light emitted in the reverse direction of the fluorescent tubes back towards LCD 12 in a manner to encourage or enhance an even distribution of light intensity on the LCD. In this example, a reflecting surface 20 of reflector body 24 is sculptured to form cylindrically circular or parabolic reflection behind fluorescent tubes 18 as desired for the particular circumstance.

Light emitted during daylight operating conditions is exhibited in FIG. 9 by rays 30 emanating from the fluorescent light tubes. As shown, it is seen that forward emitted rays proceed directly towards and through LCD panel 12 while the back side rays are reflected from surface 20. This illustrates the prior art normal manner of operation for daytime viewing where the LCD display unit can be read with high brightness and good contrast. As a general rule, a diffuser plate 16 is placed in the path of the backlighting rays before they reach LCD 12. The diffuser 16 tends to smooth out the light intensity to aid in obtaining even intensity across the entire surface area of the LCD.

In this embodiment slots 23 are cut through reflector body 24 just below the location of primary fluorescent tubes 18. The length and width of such slots will depend upon the particular size and design for the display area required. Mounted behind slots 23 are secondary fluorescent tubes 37. Interposed between fluorescent tubes 37 and slots 23 may be a filter plate 39.

For low light level operation, primary fluorescent tubes 18 are turned off and secondary fluorescent sources 37 are turned on. Light radiating from tubes 37 passes through filter plate 39 and slots 23 before being intercepted by primary fluorescent tubes 18. The intensity and light balance of the low-level light is controlled by the choice for filter 39 and by adjustment of the power to secondary fluorescent tubes 37. The low-level light is further diffused and scattered by primary fluorescent tubes 18 and, finally, is emitted smoothly as rays 34 before transiting LCD panel 12.

Figure 1:
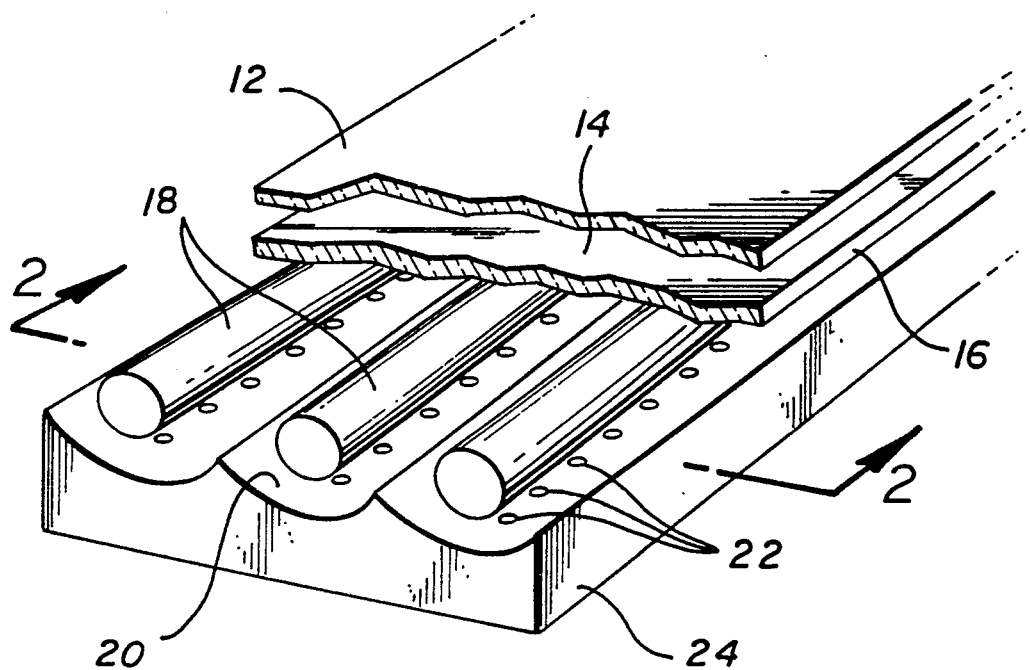
FIG. 1 shows a cut away view of the construction of a backlit display utilizing primary fluorescent light tubes backed by holes for housing low-level miniature lamp sources.

In another preferred embodiment for a liquid crystal display panel, backlighting is again created by fluorescent light tubes either formed in a continuous serpentine fashion or by using separate fluorescent light tube positioned parallel to one another behind liquid crystal panel 12 display unit. FIG. 1 illustrates the general construction for an LCD display utilizing separate fluorescent light tubes 18 positioned behind liquid crystal display panel 12.

Figure 2:
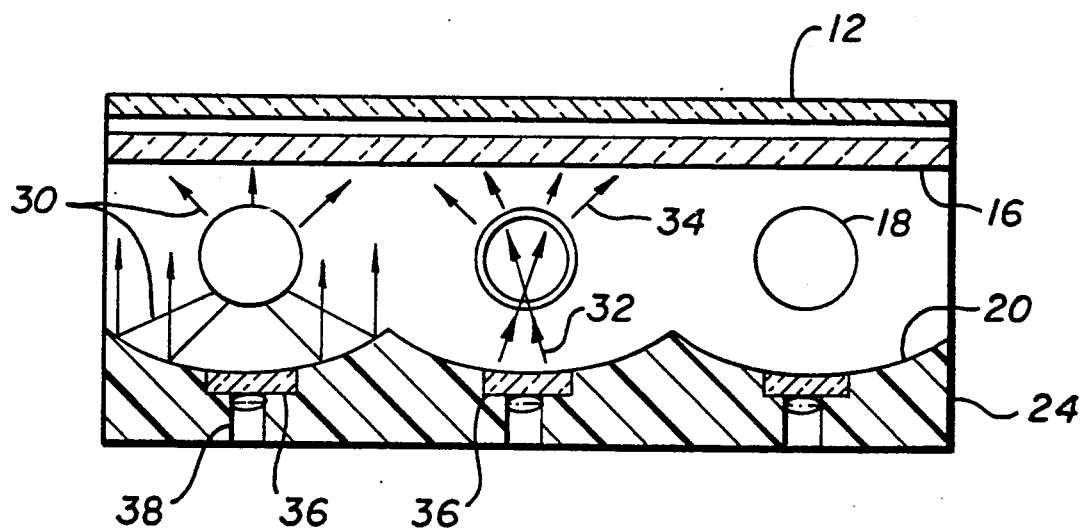
FIG. 2 is a cross-sectional view from FIG. 1 showing detail installation of low-level light sources beneath the fluorescent light tubes.

FIG. 2 shows a cross-sectional view at points A—A in FIG. 1 which further aid to view the construction configuration. A reflector body 24 is again placed behind the fluorescent tubes 18 to reflect light emitted in the reverse direction of the fluorescent tubes back towards LCD 12 in a manner to encourage or enhance an even distribution of light intensity on the LCD panel. Light emitted during daylight operating conditions is exhibited in FIG. 2 by the rays 30 emanating from the fluorescent light tubes. Again, diffuser plate 16 is placed in the path of the backlighting rays before they reach the LCD to smooth out the light intensity across the entire surface area of LCD panel 12.

The invention presented here is embodied in the insertion within reflector block 24 of low-level light sources 38. For the particular embodiment shown in FIGS. 1 and 2, the placement of these low-level light sources 22 are more effectively located along the axis and behind each fluorescent light tube 18. By this arrangement, as shown in FIG. 2, low-level light emitted by light source 38, represented by rays 32, will be intercepted by the fluorescent light tubes and reradiated for the most part as rays 34. This effect serves to provide a diffusing nature to light reaching LCD 12. The net result is a low intensity, diffused light level impinging on LCD 12 which is well balanced across the surface area. The further use of a diffuser 16 is not generally necessary, although depending on the circumstances is capable of being applied as required.

The low-level light sources 38 may be either incandescent or light emitting diodes (LED). These light sources may also be constructed with lenses to aid focusing their emitted light into fluorescent light tubes 18. Various color low-level sources may be placed in their locations in a manner that they may be adjusted and controlled to yield light of a proper color, usually white, for transmission and modification by the LCD.

In the inventions embodiment red, blue and green lights are used and adjusted so that a white color balance to the display is selectable. With these miniature, low-level light sources chosen so that their emission is night vision compatible, there is no need to operate the fluorescent tubes. During night vision operation such fluorescent light tubes would be turned off. In the event that selected low-level light sources emit a higher than desired intensity in the near infrared, small night vision filter inserts 36 may be placed to reduce the intensity emitted by low-level light sources 38 to an acceptable level.

Figure 3:
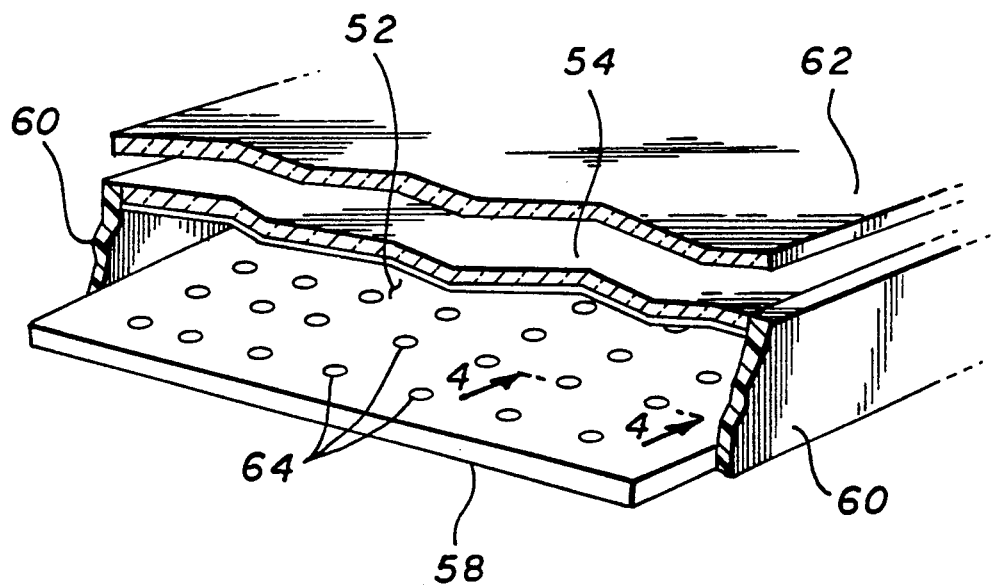
FIG. 3 shows a cut away view of the construction of a flat fluorescent lamp which functions as a backlighting source.

In FIG. 3, the flat fluorescent light source 52 is constructed of an upper glass panel 54 and a lower glass panel 58. Each of these glass panels contains a phosphor layer 56 on their inner surfaces. Electrodes for activating the fluorescent cavity are located at sides 60 to cavity 52.

The combination of upper glass panel 54, lower glass panel 58, phosphor layers 56, and electrodes 60 make up the flat fluorescent light source. An activate matrix LCD or electrooptically modulated light valve 62 is located above said light source. Daylight viewing would be accomplished with the above described combination. A diffuser plate, if necessary, could be inserted between LCD 62 and the flat luminescent light source.

Figure 4:
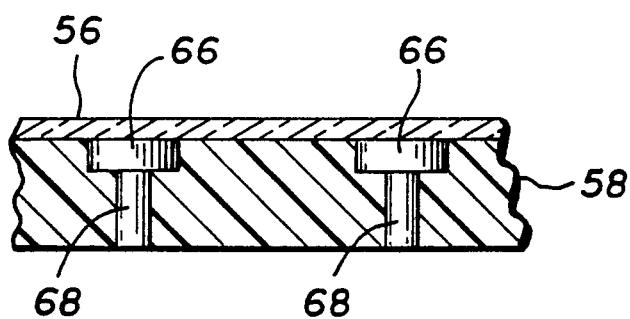
FIG. 4 is a cross-sectional view of the flat fluorescent lamp showing the detail installation of low-level light sources.
Figure 5:
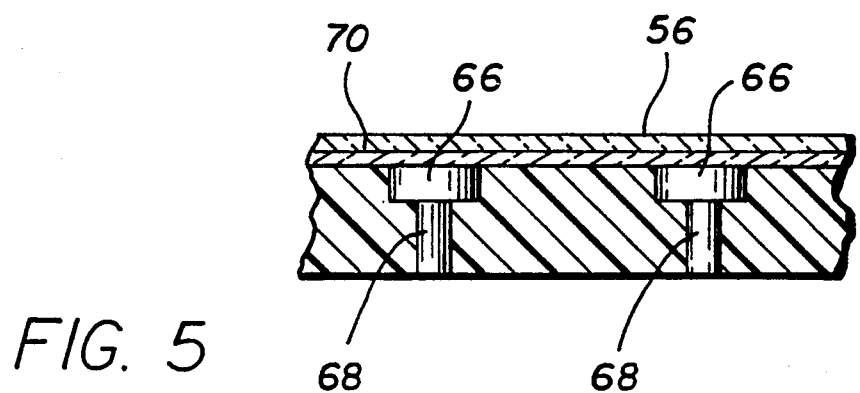
FIG. 5 is a cross-sectional view of the fluorescent lamp backlighting source showing an alternative detail installation construction for the low-level light sources.

FIGS. 4 and 5 show cross-sectional cutaways of lower glass panel 58 with installation of low-level intensity light sources. In FIG. 4 low-level light sources 68 are installed in lower glass panel 58. Again, as may be required, small night vision filter 66 may be placed to reduce the intensity or correct the emission spectrum of low-level light sources 68. As shown, the low-level light sources are installed below phosphor layer 56 on lower glass plate 58. FIG. 3 illustrates one manner of arraying the location 64 of the low-level light sources on the surface area of plate 58. Of course, it is to be recognized that many array configurations are possible. In cases where further diffusion of light emitted by arrays 64 of low-level light sources is desired, a diffuser 70 may be installed on lower glass panel 58 beneath phosphor layer 56. This diffuser 70 can further smooth and aid in distributing the intensity across the surface area in a more uniform manner.

FIG. 6 illustrates a solid state optical plate 82 used as a lightwave guide for backlighting an LCD. Fluorescent light tubes 84 illuminate the edges of light guide 82. Lightwaves 88 emanating from fluorescent tubes 84 move through waveguide 82 by reflecting from one surface to the other back and forth across the width of the light guide. The lower surface 86 of light guide 82 is roughened slightly to cause diffused scattering of light rays 88. This results in a diffused spread of light ray 90 in the direction towards the LCD. This diffused reflection occur continuously throughout waveguide 82 along surface 86. By this means, the LCD is illuminated from behind with a reasonably uniform field of light across its surface area.

In FIG. 7, light guide 82 is shown configured on two sides by fluorescent light tubes 84 and augmented on all four sides by distributed arrays of low-level intensity light sources 92. Therefore, the same principle as illustrated in the examples described above can be effective through light guide 82.

During daylight viewing, fluorescent light tubes 84 illuminate through light guide 82 to allow bright and high contrast viewing of the LCD. For night time viewing through night vision equipment, fluorescent tubes 84 are turned off and the low-level light sources located in arrays 92 are activated. Again, varying colored incandescent low-level light sources or LED sources are distributed over light arrays 92. Adjustment of the combinations of colors used such as blue, red, and green light, allow for establishing a desired white color balance throughout light guide 82. The installation of low-level light sources in arrays 92 may again be augmented with small night vision filter such as shown as 66 in FIGS. 4 and 5.

While these specific embodiments of the invention herein have been illustrated and described in detail, it will be appreciated that the invention is not limited thereto, since many modifications may be made by one skilled in the art which fall within the true spirit and scope of the invention.

What is claimed is:

1. A backlit electrooptic modulated light valve display panel which is readable with the unaided eye under bright lighting conditions of day light and is readable with night vision equipment under dark conditions of night which comprises:
    an electrooptic modulated light valve panel for controllably modifying light being transmitted therethrough into readable colored patterns of information;
    a means for emitting high intensity light through said electrooptic modulated light valve panel and activated for daylight viewing of the display; and
    a means for emitting low intensity light through said electrooptic modulated light valve panel for viewing in dark conditions with night vision equipment, and with said means for emitting high intensity light deactivated.

2. A backlit electrooptic modulated light valve display panel according to claim 1 wherein said means for emitting high intensity light is a flat fluorescent lamp.

3. A backlit electrooptic modulated light valve display panel according to claim 1 wherein said means for emitting high intensity light is a side illuminated, internally reflecting, solid state light pipe.

4. A backlit electrooptic modulated light valve display panel according to claim 1 wherein said means for emitting low intensity light is an array of miniature incandescent lamps.

5. A backlit electrooptic modulated light valve display panel according to claim 4 wherein said array of miniature incandescent lamps further comprises:
    multiple individual incandescent lamps fitted with filters to controllably further reduce the low intensity light emitted to a preselected level suitable for viewing said display in the dark with night vision equipment.

6. A backlit electrooptic modulated light valve display panel according to claim 1 wherein said means for emitting low intensity light is an array of light emitting diodes.

7. A backlit electrooptic modulated light valve display panel according to claim 6 wherein said array of light emitting diodes further comprises:
    multiple individual light emitting diodes fitted with filters to controllably further reduce the low intensity light emitted to a preselected level suitable for viewing said display in the dark with night vision equipment.

8. A backlit electrooptic modulated light valve display panel according to claim 1 wherein said electrooptic modulated light valve panel is a liquid crystal panel.

9. A backlit electrooptic modulated light valve display panel which is readable with the unaided eye under bright lighting conditions of daylight and is readable with night vision equipment under dark conditions of night which comprises:
    an electrooptic modulated light valve panel for controllably modifying light being transmitted therethrough into readable colored patterns of information;
    at least one primary fluorescent lighting means for emitting high intensity backlighting which is transmitted through said electrooptic modulated light valve panel and activated during daylight viewing of the display; and
    at least one secondary fluorescent lighting means for emitting low intensity backlighting which is transmitted through deactivated said primary light emitting tubes and therefrom through said electrooptic modulated light valve panel during viewing of the display under low lighting conditions.

10. A backlit electrooptic modulated light valve display panel according to claim 9 further comprising:
    a reflecting surface being positioned on a side of said primary fluorescent lighting means opposite the placement of said electrooptic modulated light valve panel whereby light from said primary fluorescent lighting means is reflected through said electrooptic modulated light valve panel, said reflecting surface containing slots of select lengths and widths.

11. A backlit electrooptic modulated light valve display panel according to claim 10 wherein said secondary fluorescent lighting means for emitting low intensity backlighting are positioned and controlled to radiate low-level light through said slots.

12. A backlit electrooptic modulated light valve display panel according to claim 11 further comprising:
    a filter means placed between said secondary fluorescent lighting means and said slots.

13. A backlit electrooptic modulated light valve display panel according to claim 12 wherein said primary and secondary fluorescent lighting means are fluorescent light emitting tubes.

14. A backlit electrooptic modulated light valve display panel according to claim 13 wherein said electrooptic modulated light valve panel is a liquid crystal panel.

15. A backlit electrooptic modulated light valve display panel which is readable with the unaided eye under bright lighting conditions of daylight and is readable with night vision equipment under dark conditions of night which comprises:
    an electrooptic modulated light valve panel for controllably modifying light being transmitted therethrough into readable colored patterns of information;
    at least one fluorescent lighting means for emitting high intensity backlighting which is transmitted through said electrooptic modulated light valve panel and activated during daylight viewing of the display; and multiple low-level light emitting sources placed near deactivated said fluorescent lighting means for emitting low intensity backlighting which is transmitted through said electrooptic modulated light valve panel during viewing in dark conditions with night vision equipment.

16. A backlit electrooptic modulated light valve display panel according to claim 15 further comprising:

a reflecting surface being positioned on a side of said fluorescent lighting means opposite the placement of said electrooptic modulated light valve panel whereby light from said primary fluorescent lighting means is reflected through said electrooptic modulated light valve panel.

17. A backlit electrooptic modulated light valve display panel according to claim 16 wherein said low-level light emitting sources are imbedded within the surface of said reflecting surface.

18. A backlit electrooptic modulated light valve display panel according to claim 17 wherein said low-level light sources are an array of miniature incandescent lamps.

19. A backlit electrooptic modulated light valve display panel according to claim 18 wherein said miniature incandescent lamps further comprises:

multiple individual incandescent lamps fitted with optical lenses which aid in focusing their emitted low-level light into said fluorescent tubes.

20. A backlit electrooptic modulated light valve display panel according to claim 19 wherein said array of miniature incandescent lamps further comprises:

multiple individual incandescent lamps fitted with filters to controllably further reduce the low intensity light emitted to a preselected level suitable for viewing said display in the dark with night vision equipment.

21. A backlit electrooptic modulated light valve display panel according to claim 17 wherein said low-level light sources are in array of light emitting diodes.

22. A backlit electrooptic modulated light valve display panel according to claim 21 wherein said array of light emitting diodes further comprises:

multiple individual light emitting diodes fitted with filters to controllably further reduce the low intensity light emitted to a preselected level suitable for viewing said display in the dark with night vision equipment.

23. A backlit electrooptic modulated light valve display panel according to claim 17 further comprising:

a diffusing means placed between said fluorescent lighting means and said electrooptic modulated light valve panel.

24. A backlit electrooptic modulated light valve display panel according to claim 17 further comprising:

a filter means placed between said fluorescent lighting means and said electrooptic modulated light valve panel.

25. A backlit electrooptic modulated light valve display panel according to claim 15 wherein said electrooptic modulated light valve panel is a liquid crystal panel.

* * * * *